(12) United States Patent
Docter et al.

(10) Patent No.: US 6,698,190 B2
(45) Date of Patent: Mar. 2, 2004

(54) DEVICE AND METHOD FOR CLEANSING EXHAUST GAS

(75) Inventors: Andreas Docter, Esslingen (DE); Andreas Kaupert, Ulm (DE); Bernd Krutzsch, Denkendorf (DE); Arnold Lamm, Elchingen (DE); Bernhard Vogel, Stuttgart (DE); Steffen Oliver Wieland, Wetzlar (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 10/132,791

(22) Filed: Apr. 25, 2002

(65) Prior Publication Data

US 2002/0170286 A1 Nov. 21, 2002

(30) Foreign Application Priority Data

Apr. 25, 2001 (DE) .......................................... 101 20 097

(51) Int. Cl.$^7$ ................................................. F01N 3/00
(52) U.S. Cl. ............................. 60/285; 60/274; 60/279; 60/286; 60/295; 60/303; 123/DIG. 12; 123/3
(58) Field of Search .......................... 60/274, 284, 286, 60/279, 295, 300, 303, 285; 123/DIG. 12, 3

(56) References Cited

U.S. PATENT DOCUMENTS

| | | | | |
|---|---|---|---|---|
| 3,908,371 A | * | 9/1975 | Nagai et al. ................... | 60/303 |
| 3,918,412 A | * | 11/1975 | Lindstrom ...................... | 123/3 |
| 4,147,136 A | * | 4/1979 | Noguchi et al. ............... | 123/3 |
| 5,301,502 A | * | 4/1994 | Oota et al. ..................... | 60/286 |
| 5,586,433 A | * | 12/1996 | Boegner et al. .............. | 60/274 |
| 5,921,076 A | * | 7/1999 | Krutzsch et al. .............. | 60/274 |
| 5,946,906 A | * | 9/1999 | Akazaki et al. ............... | 60/278 |
| 5,964,089 A | * | 10/1999 | Murphy et al. ............... | 60/286 |
| 6,176,078 B1 | * | 1/2001 | Balko et al. .................. | 60/274 |
| 6,526,950 B2 | * | 3/2003 | Ito et al. ...................... | 123/518 |

\* cited by examiner

Primary Examiner—Binh Tran
(74) Attorney, Agent, or Firm—Pendorf & Cutliff

(57) ABSTRACT

An exhaust gas purification device in a vehicle, wherein a reforming reactor is provided for extraction of hydrogen from fuel and the hydrogen is supplied to an exhaust gas stream of an internal combustion engine upstream of the exhaust gas catalytic converter, wherein the reforming reactor includes a supply device for oxygen and/or water, wherein the reforming reactor is connected with a side branch of the exhaust gas conduit and wherein oxygen and water for reforming are supplied in the form of an exhaust gas partial stream via the side branch.

14 Claims, 1 Drawing Sheet

DEVICE AND METHOD FOR CLEANSING EXHAUST GAS

BACKGROUND OF THE INVENTION

1. Field of the Invention

The invention concerns an exhaust gas purification device of the type wherein a reforming reactor is provided for extraction of hydrogen from fuel and the hydrogen is supplied to an exhaust gas stream of an internal combustion engine upstream of the exhaust gas catalytic converter, and a process for operating the device.

2. Description of the Related Art

From U.S. Pat. No. 5,412,946 A1 an exhaust gas purification device for a vehicle is known, in which hydrogen is introduced into the exhaust gas stream in order to reduce nitrous oxide in the exhaust gas catalytic converter. The hydrogen is obtained by reforming, for example—from the co-introduced fuel (hydrocarbons), and is introduced together with oxygen and water into the reforming unit. Therein the content of the supplied hydrogen is adjusted depending upon the amount of $NO_x$— in the exhaust gas stream. Water for reforming is provided by a water tank and is vaporized prior to the reforming process, while oxygen is drawn in in the form of ambient air and is supplied to the reforming device.

SUMMARY OF THE INVENTION

The invention is concerned with the task of providing an exhaust gas purification device with which a simplified system becomes possible.

This task is solved by an exhaust gas purification device in a vehicle, wherein a reforming reactor is provided for extraction of hydrogen from fuel and the hydrogen is supplied to an exhaust gas stream of an internal combustion engine upstream of the exhaust gas catalytic converter, wherein the reforming reactor includes a supply device for oxygen and/or water, wherein the reforming reactor is connected with a side branch of the exhaust gas conduit and wherein oxygen and water for reforming are supplied in the form of an exhaust gas partial stream via the side branch, and a process for operating the device.

In accordance with the invention, for reforming, the water and oxygen that are employed are exclusively from the exhaust gas stream. The requirement for supplemental media tanks and corresponding control devices can thus be dispensed with.

The advantage is comprised therein, that $H_2$ and CO can be obtained in simple manner in the vehicle as the reducing agents for the $NO_x$-removal in the conventional exhaust gas post-treatment. The feed material for the inventive process originates from the fuel tank accessible in the vehicle and the internal combustion exhaust gas. There is no need to carry supplemental materials on board the vehicle. No tanks and measuring devices are required for the supplemental materials.

Preferably an electrical heating means is employed only during the heating phase; later, the partial exhaust gas stream supplied to the reformer can be regeneratively pre-heated by the hot product gas stream. The autothermic process requires, in the stationary case, no electrical heating from outside. Thus electrical energy can be saved.

The employment of a catalyst on a carrier structure makes possible minimal pressure losses, so that the pressure in the side branch is comparable with that in the exhaust gas conduit. The amount of catalyst itself is lower and exhibits a better efficiency than in the case of the conventionally employed bulk catalyst. The amount of catalyst which is dispensed with corresponds to an amount which need not be heated.

It will be readily understood that the above mentioned features and the following discussed features need not be employed only in the respective discussed combinations, but rather can be employed also in other combinations or by themselves, without leaving the framework of the present invention.

BRIEF DESCRIPTION OF THE DRAWINGS

The invention is described in the following in greater detail on the basis of the figures, wherein there is shown in.

DETAILED DESCRIPTION OF THE INVENTION

Figure 1:
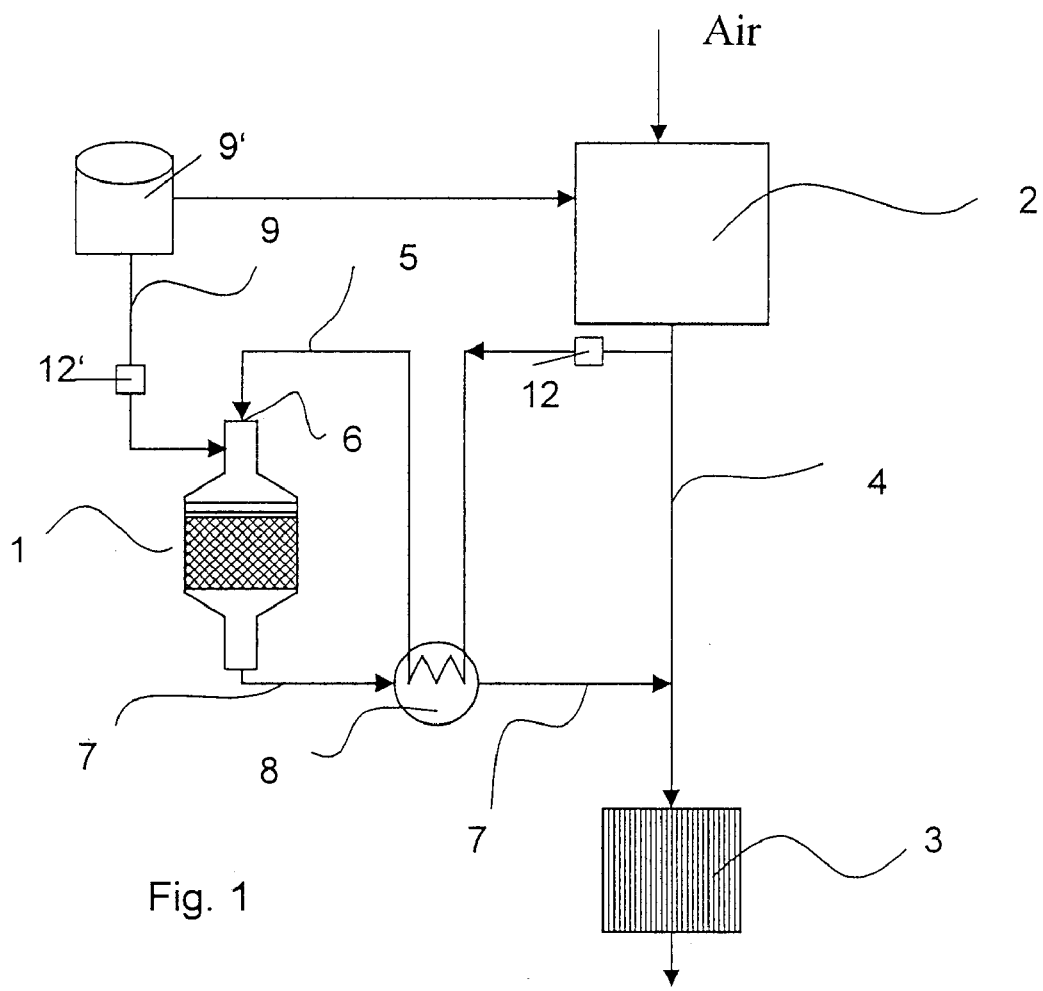
FIG. 1 a schematic representation of a preferred device with branched exhaust stream.

FIG. 1 shows a schematic representation of an exhaust gas purifying device according to the invention, which is preferably employed in a vehicle. Details of the vehicle are not shown. Exhaust gas of an internal combustion engine 2, which is the product of the combustion of fuel from a fuel tank 9' supplied to the internal combustion engine 2, is directed from an exhaust gas conduit 4 to a conventional exhaust gas catalytic converter 3, which is preferably outfitted with a so-called DENOX-catalytic converter. Hydrogen as reducing agent is supplied to the exhaust gas stream in the exhaust gas conduit 4, so that in the exhaust gas catalytic converter 3 nitrous oxide is reduced to harmless substances.

In accordance with the invention a part of the stream of the exhaust gas is branched off in a branch 5 of the exhaust gas stream 4 and supplied to a reforming reactor 1. In the reforming reactor 1 hydrogen is extracted from the fuel, which is supplied to the reactor via a fuel line 9 from the fuel tank 9'. The reformate, which contains hydrogen and further reaction products such as for example CO and $CO_2$, is subsequently returned to the exhaust gas conduit 4 of the internal combustion engine 2 upstream of the exhaust gas catalytic converter 3 via a conduit 7. In addition to being supplied with fuel via fuel line 9, the reforming reactor 1 is supplied via a supply device 6 with oxygen and/or water, in order to be able to carry out the reforming reaction. In accordance with the invention the oxygen and the water necessary for reforming are provided by the exhaust gas partial stream, which is directed through the side branch 5, that is, that the supply device 6 is supplied via the side branch 5 of the exhaust gas stream. The advantage therein is that no supplemental supply tanks need be provided for educts such as water or compressors for the oxygen or air. Further, since the water supplied via the exhaust gas stream is essentially steam, a vaporization device for the supplied water can be dispensed with. This results in a substantial space and weight saving as well as a saving in cost for the vehicle. Therein it is particularly advantageous to use the same fuel for reforming as is used by the internal combustion engine 2, namely diesel or gasoline. This also contributes to the simplification of the overall system, since supplemental pumps and supplemental control means for the otherwise necessary fuels additionally carried in the vehicle and the like can be dispensed with.

It is particularly advantageous when means 12, 121 are provided, in order to adjust or set the relationship φ of oxygen in the supply device 6 to fuel in the reforming reactor 1. Therein both the amount of fuel as well as the amount of exhaust gas can be adjusted, using valves and/or regulators. It is particularly advantageous to provide a flow sensor 12' in the supply line 9 of the fuel in the reforming reactor 1, in order to determine and adjust the supplied fuel amount and/or an oxygen sensor 12 in the side branch 5, in order to determine the amount of oxygen in the exhaust gas and to accordingly appropriately adjust the exhaust gas stream in the side branch.

The relationship φ represents the so-called air value of reforming and provides the relationship of the supplied amount of oxygen to the stoichiometrically required oxygen amount for the complete oxidation of the fuel to be reformed in the reforming reactor 1.

In the reforming reactor 1 the components $O_2$ and $H_2O$ of the partial stream of the exhaust gas as well as the supplied amount of fuel which is in relationship to the $O_2$-content of the exhaust gas, catalytically and autothermically react with each other, whereby resort is exclusively made to the concentration of $O_2$ and $H_2O$ present in the exhaust gas and the amount of fuel taken from the conventional tank of the vehicle.

It is particularly advantageous to carry out a Lambda-regulation or feedback control, in order to meter the fuel depending upon the oxygen content in the side branch 5 of the exhaust gas stream 4 into the reforming reactor 1. In a preferred metering arrangement for the amount of fuel to be supplied, a partial stream of the exhaust gas of the exhaust gas stream 4 is extracted via a stream splitter. By means of volume flow measurement, for example with a hot wire anemometer, and $O_2$-concentration measurements, for example using a Lambda-probe, the volume flow of $O_2$ in the partial stream 5 is determined. According to the desired air value φ of the autothermic reforming, the amount of fuel is supplied to the reforming reactor 1.

In the reforming reactor 1 there occur not only reforming reactions, but rather also partial oxidation reactions of the supplied fuel with the composition $C_nH_m$ with the oxygen contained in the exhaust gas:

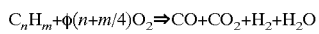

as well as reforming reaction with the $H_2O$ contained in the exhaust gas and the $H_2O$ formed during the partial oxidation

In the case of the coexistence of oxidation and reforming these reactions are conventionally referred to as autothermic reforming.

Suitable reaction conditions are approximately a preferred air value of φ=0.25 to 0.35 and an educt temperature at the inlet of the reforming reactor 1 of greater than 350° C.

The temperatures of the exhaust gas in the partial stream in the side branch 5 or also in the main stream in the exhaust gas conduit 4 are lower than the desired educt temperatures for reforming, particularly in the case of diesel vehicles, and above all in the start-up phase.

It is thus advantageous to have the partial stream of the exhaust gas heated by the evolved heat of the reforming reactor 1. The oxidation reaction is strongly exothermic, so that the mixture in the reforming reactor 1 is strongly heated, typically to 800–900° C. Therewith sufficient thermal energy is available for the endothermic reforming reaction in the reforming reactor 1. Excess thermal energy can be employed in the system.

The available thermal energy of the heat evolved in the reforming reactor 1 can advantageously also be used for vaporization of the fuel to be reformed. Further, it is advantageous to thermally connect the reforming reactor 1 with the exhaust gas conduit, using for example a conventional exhaust gas elbow, so that also the heat evolved in the exhaust gas conduit can be utilized. It is also advantageous to preheat the exhaust gas partial stream in the side branch 5, wherein this is directed through a heat exchanger 8, which is heated by the hot product stream, which exits from the reforming reactor 1. For this the heat exchanger 8 is provided in the conduit 7 which directs the reaction products back to the exhaust gas conduit 4.

Figure 2:
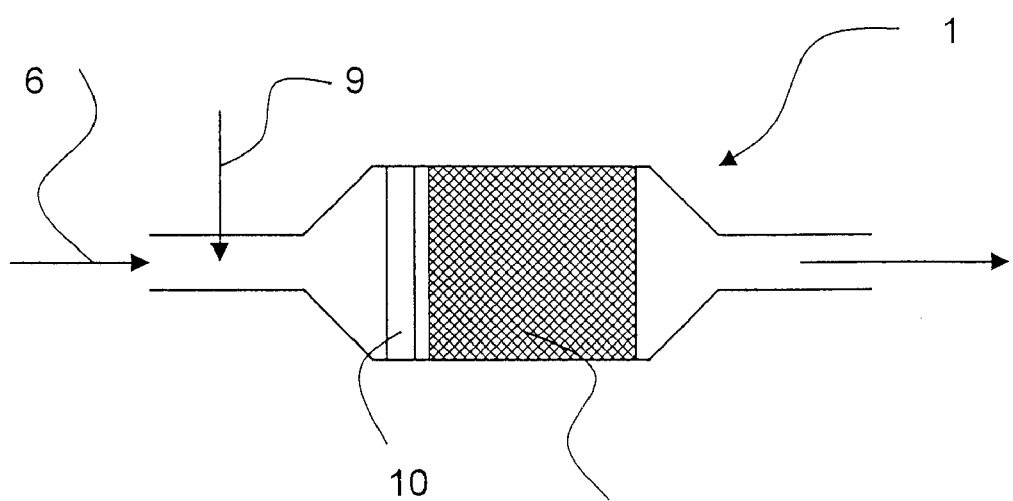
FIG. 2 a schematic representation of a detail of the preferred reforming reactor.

In FIG. 2 a preferred embodiment of the reforming reactor 1 is schematically represented. In the reforming reactor 1 heating means 10 are provided for heating the reforming reactor 1 during the start up phase and the catalyst 11. The catalyst 11 is preferably provided on a carrier structure, thereby causing only a small pressure drop. The heating means 10 are preferably provided upstream of the catalyst 11. Due to the carrier structure of the catalyst 11 the pressure drop in the reforming reactor is low, so that the pressure in the side branch 5 of the exhaust gas stream is likewise low. It is thus possible to simply branch the exhaust gas partial stream out of the exhaust gas conduit 4 and there is no need to actively overcome a pressure differential. Preferably the catalyst layer on the carrier structure of the catalytic converter is only a few micrometers thick. This brings about the advantage that at high temperatures of approximately 800° C., as are employed for reforming of hydrocarbons, in comparison to bulk catalytic converters of the same size, that no pore diffusion constriction occurs and the employed catalyst 11 is almost completely utilized. Typical bulk catalytic converters are comprised of balls of catalytic material, which have a diameter in the millimeter range. Accordingly there is avoided the need to heat this supplemental catalyst bulk, as well as a savings in weight.

The heating means 10 can be electrical heating means such as a glow plug or a coiled filament or any other resistor. It is preferable to provide the electrical heating means 10 upstream in advance of the actual catalytic converter structure 11. It is useful to heat the reforming reactor 1 electrically only in the start-up or warm-up phase. Later the exhaust gas stream supplied to the reforming reactor 1 can be preheated regeneratively by the hot product gas stream at the outlet of the reforming reactor 1. The employed autothermic reforming process requires in the stationary case no supplemental heating from outside. Accordingly energy can be saved in comparison to the endothermic vaporization reforming process.

By the inventive process and the inventive device it becomes possible in simple manner to obtain $H_2$ and CO in a vehicle as reduction agent for the $NO_x$-removal during the conventional exhaust gas treatment. The carrying along of these materials as supplemental feed materials is no longer necessary. The materials used for the described process originate instead from the fuel tank available in the vehicle (liquid hydrocarbons) and the combustion exhaust gas. Thus no supplemental tanks and dosing or metering devices are necessary.

What is claimed is:

1. An exhaust gas purifying device in a vehicle, wherein a reforming reactor (1) is provided for extraction of hydrogen from fuel and wherein the hydrogen is supplied to an exhaust gas stream in an exhaust gas conduit (4) of the internal combustion engine (2) upstream of the exhaust gas catalytic converter (3), wherein the reforming reactor (1)

includes a supply device (6) for oxygen and/or water, wherein the reforming reactor (1) is connected with a side branch (5) of the exhaust gas conduit (4), wherein oxygen and water for reforming are obtained in the form of an exhaust gas partial stream via the side branch (5), wherein the reforming reactor (1) is provided with means (12, 12') for adjusting the relationship ($\phi$) of oxygen to fuel in the reforming reactor (1), and wherein fuel is metered or supplied to the reforming reactor (1) in dependence upon the oxygen content of the exhaust gas stream in the side branch (5) of the exhaust gas conduit (4).

2. An exhaust gas purification device according to claim 1, wherein an oxygen sensor (12) is provided in the side branch (5).

3. An exhaust gas purification device according to claim 2, wherein valves and/or regulators are provided in a supply line (9) and/or in the side branch (5) for adjusting the amount of fuel supplied to the reforming reactor (1) and/or the exhaust gas stream in the side branch (5).

4. An exhaust gas purification device according to claim 2, wherein the heating means (10) are electrical heating means.

5. An exhaust gas purification device according to claim 1, wherein in the supply line (9) for fuel in the reforming reactor (1) a mass flow sensor (12') is provided.

6. An exhaust gas purification device according to claim 1, wherein heating means (10) are provided for heating the reforming reactor (1).

7. An exhaust gas purification device according to claim 6, wherein the reforming reactor (1) is thermally coupled with the exhaust gas conduit (4) and/or an exhaust gas bent pipe or elbow.

8. An exhaust gas purification device according to claim 1, wherein the reforming reactor (1) includes a catalytic converter (11) with a low pressure-drop carrier structure.

9. An exhaust gas purification device according to claim 1, wherein the pressure in the side branch (5) is at most equal to the pressure in the exhaust gas conduit (4).

10. A process for operating an exhaust gas purification device in a vehicle, wherein a reforming reactor (1) is provided for extraction of hydrogen from fuel and wherein the hydrogen is supplied to an exhaust gas stream in an exhaust gas conduit (4) of the internal combustion engine (2) upstream of the exhaust gas catalytic converter (3), wherein the reforming reactor (1) includes a supply device (6) for oxygen and/or water, wherein the reforming reactor (1) is connected with a side branch (5) of the exhaust gas conduit (4), said process comprising:

supplying a part of the stream of the exhaust gas in the exhaust gas conduit (4) to the reforming reactor (1), and carrying out the reformation of the fuel using oxygen and/or water contained in the partial stream of the exhaust gas, and wherein the amount of fuel supplied to the reforming reactor (1) is adjusted depending upon the oxygen content of the partial stream.

11. A process according to claim 10, wherein the exhaust gas stream in the side branch (5) is heated by the heat evolved in the reforming reactor (1).

12. A process according to claim 10, wherein the fuel to be reformed is vaporized by the heat from the reforming reactor (1).

13. A process according to claim 10, wherein the reforming reactor (1) is heated electrically during a cold start phase.

14. A process according to claim 10, wherein the reforming reactor (1) is heated by an exhaust gas elbow or curved pipe.

* * * * *